US012755094B2

(12) United States Patent
Ramsl

(10) Patent No.: US 12,755,094 B2
(45) Date of Patent: Oct. 6, 2026

(54) INTELLIGENT QR CODE COMPRESSION BY COMPRESSING TEXT

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 810 days.

(21) Appl. No.: 17/738,910

(22) Filed: May 6, 2022

(65) Prior Publication Data

US 2023/0359819 A1 Nov. 9, 2023

(51) Int. Cl.
*G06F 40/274* (2020.01)
*G06F 40/289* (2020.01)
*G06F 40/30* (2020.01)
*G06K 19/06* (2006.01)

(52) U.S. Cl.
CPC .......... *G06F 40/274* (2020.01); *G06F 40/289* (2020.01); *G06F 40/30* (2020.01); *G06K 19/06037* (2013.01)

(58) Field of Classification Search
CPC ...... G06F 40/274; G06F 40/289; G06F 40/30; G06K 19/06037
See application file for complete search history.

(56) References Cited

U.S. PATENT DOCUMENTS 5,983,186 A * 11/1999 Miyazawa .............. G10L 15/26 704/E15.045
6,728,344 B1 * 4/2004 Iyengar ............... H04M 1/6505 704/201
11,880,644 B1 * 1/2024 Shevchenko ......... G06F 40/131
2009/0119090 A1 * 5/2009 Niu ........................ G06F 40/247 704/1
2013/0197992 A1 * 8/2013 Bao .................... G06Q 30/0239 705/14.43
2014/0175163 A1 * 6/2014 Tankleff ................. G09G 3/006 235/375
2017/0102848 A1 * 4/2017 Samaras ............... G06F 16/958
2017/0239576 A1 * 8/2017 Hsiao ...................... A63F 13/63
2018/0107678 A1 * 4/2018 Gluck ................... G06F 40/123
2019/0108430 A1 * 4/2019 Coppedge ........... G06F 16/9554
2020/0320167 A1 * 10/2020 Mane ...................... G06F 40/40
2021/0303809 A1 * 9/2021 Roux ............... G06K 19/06037
2023/0359819 A1 * 11/2023 Ramsl .................. G06F 40/289

* cited by examiner

*Primary Examiner* — Michael N Opsasnick
(74) *Attorney, Agent, or Firm* — SCHWEGMAN LUNDBERG & WOESSNER, P.A.

(57) ABSTRACT

Example methods and systems are directed to intelligent quick response (QR) code compression. Different versions of QR codes comprise different numbers of modules and represent different amounts of text. To ensure that a QR code can be read correctly, the minimum printed size of the QR code varies with the version. As described herein, intelligent QR code compression involves converting a QR code to text, compressing the text, and generating a smaller QR code that represents the compressed text. The resulting QR code may be printed at a smaller size or stored using less memory than the original QR code. Text processing may include sentence splitting, sentence ranking, and key phrase detection. The compressed text comprises one or more detected key phrases. The amount of compression may be configurable, such that greater compression results in less original information being included in the resulting QR code.

19 Claims, 7 Drawing Sheets

INTELLIGENT QR CODE COMPRESSION BY COMPRESSING TEXT

TECHNICAL FIELD

The subject matter disclosed herein generally relates to quick response (QR) codes and, more specifically, to intelligent compression of QR codes.

BACKGROUND

A QR code is a two-dimensional machine-readable image. A QR code reader converts the image into text. The text may be a uniform resource locator ("URL") that directs a web browser to a web page.

Different versions of QR codes use a different number of data elements. QR codes using fewer data elements store less data but are easier to recognize. QR codes using more data elements store more data but are more susceptible to recognition errors.

DETAILED DESCRIPTION

Figure 1:
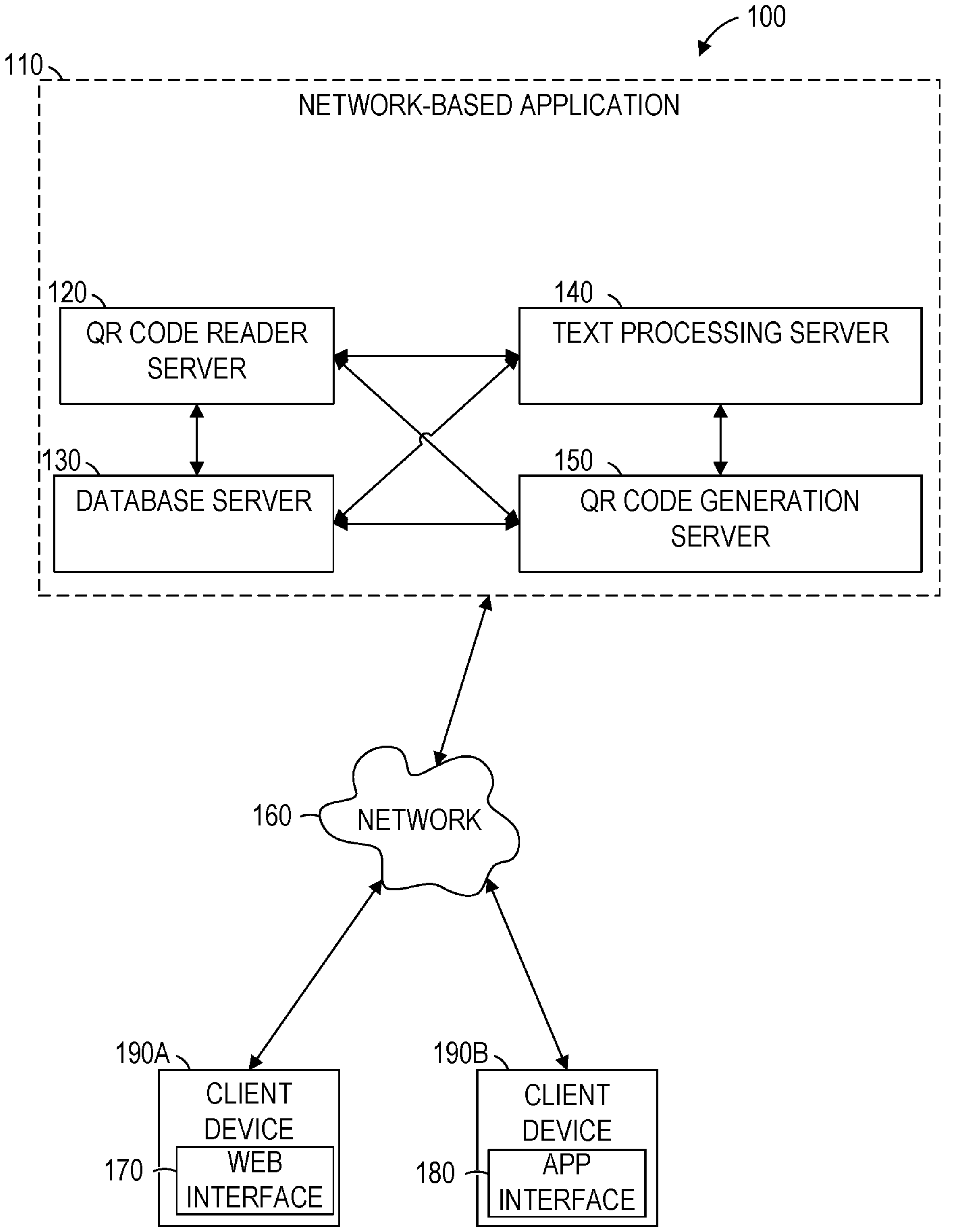
FIG. 1 is a network diagram illustrating an example network environment suitable for intelligent QR code compression.

Example methods and systems are directed to intelligent QR code compression. QR codes compress text in a small two-dimensional area. The two-dimensional area comprises a grid of modules. Each module is either black or white, and thus stores a single binary bit. Different versions of QR codes comprise different numbers of modules and represent different amounts of text. For example, a version 40 QR code comprises a grid of 177 modules in each dimension, for a total of 31,329 modules, and represents up to 4,296 alphanumeric characters. By contrast, a version 1 QR code comprises a grid of 21 modules in each dimension, for a total of 441 modules, and represents up to 25 alphanumeric characters.

To ensure that a QR code can be read correctly, the minimum printed size of the QR code varies with the version. For example, a version 2 QR code may be readable when printed at 0.6"×0.6" while a version 37 QR code may be printed at 3.3"×3.3" so that the modules are the same size. Similarly, the size of a data file storing the QR code may increase for QR codes with more modules.

As described herein, intelligent QR code compression involves converting a QR code to text, compressing the text, and generating a smaller QR code that represents the compressed text. For example, a version 4 QR code may represent the 73 characters in the text "This document contains the invoices from January 2020 until December 2020." The text may be compressed to "Invoices 2020," only 13 characters, and a version 1 QR code generated that represents the compressed text. The resulting QR code may be printed at a smaller size or stored using less memory than the original QR code.

Text processing may include sentence splitting, sentence ranking, and key phrase detection. The compressed text comprises one or more detected key phrases. The amount of compression may be configurable, such that greater compression results in less original information being included in the resulting QR code.

When these effects are considered in aggregate, one or more of the methodologies described herein may obviate a need for certain efforts or resources that otherwise would be involved in generating, reading, or processing QR codes. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for intelligent QR code compression. The network environment 100 includes a network-based application 110, client devices 190A and 190B, and a network 160. The network-based application 110 is provided by a QR code reader server 120 in communication with a database server 130, a text processing server 140, and a QR code generation server 150. The QR code reader server 120 accesses application data (e.g., application data stored by the database server 130) to provide one or more applications to the client devices 190A and 190B via a web interface 170 or an application interface 180.

The QR code reader server 120, the database server 130, the text processing server 140, the QR code generation server 150, and the client devices 190A and 190B may each be implemented in a computer system, in whole or in part, as described below with respect to FIG. 7. The client devices 190A and 190B may be referred to collectively as client devices 190 or generically as a client device 190.

The QR code reader server 120 provides a QR code reading application that converts QR codes to text. The QR codes may be captured by a camera of a mobile device (e.g., a cell phone) or accessed from storage of a mobile device, laptop, desktop computer, or server. The QR code reader server 120 may determine text represented by the QR code and cause display of the text on a display of the client device 190A or 190B. Alternatively, the QR code reader server 120 may determine the text represented by the QR code, determine that the text is a uniform resource locator ("URL") of a web-based resource, and cause presentation of the web-based resource (e.g., by downloading and rendering a web page on the web interface 170). The QR code reader server 120 may also provide the text to the text processing server 140.

The text processing server 140 accesses text, determines sentences, key phrases, or both in the text, and ranks the determined sentences or key phrases. Based on the determined sentences or key phrases and their rankings, the text processing server 140 determines compressed text to be used to generate a compressed QR code. The QR code generation server 150 generates a compressed QR code from the compressed text. The compressed QR code may be presented on a display device of a client device 190 (e.g., via a user interface provided by the QR code generation server 150 or the QR code reader server 120), stored in an image file (e.g., a Joint Photographic Experts Group ("JPEG") file, a Portable Network Graphic ("PNG") file, or a Graphical Interchange Format ("GIF") file), or any suitable combination thereof.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The QR code reader server 120, the database server 130, the text processing server 140, the QR code generation server 150, and the client devices 190A-190B are connected by the network 160. The network 160 may be any network that enables communication between or among machines, databases, and devices. Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof.

Figure 2:
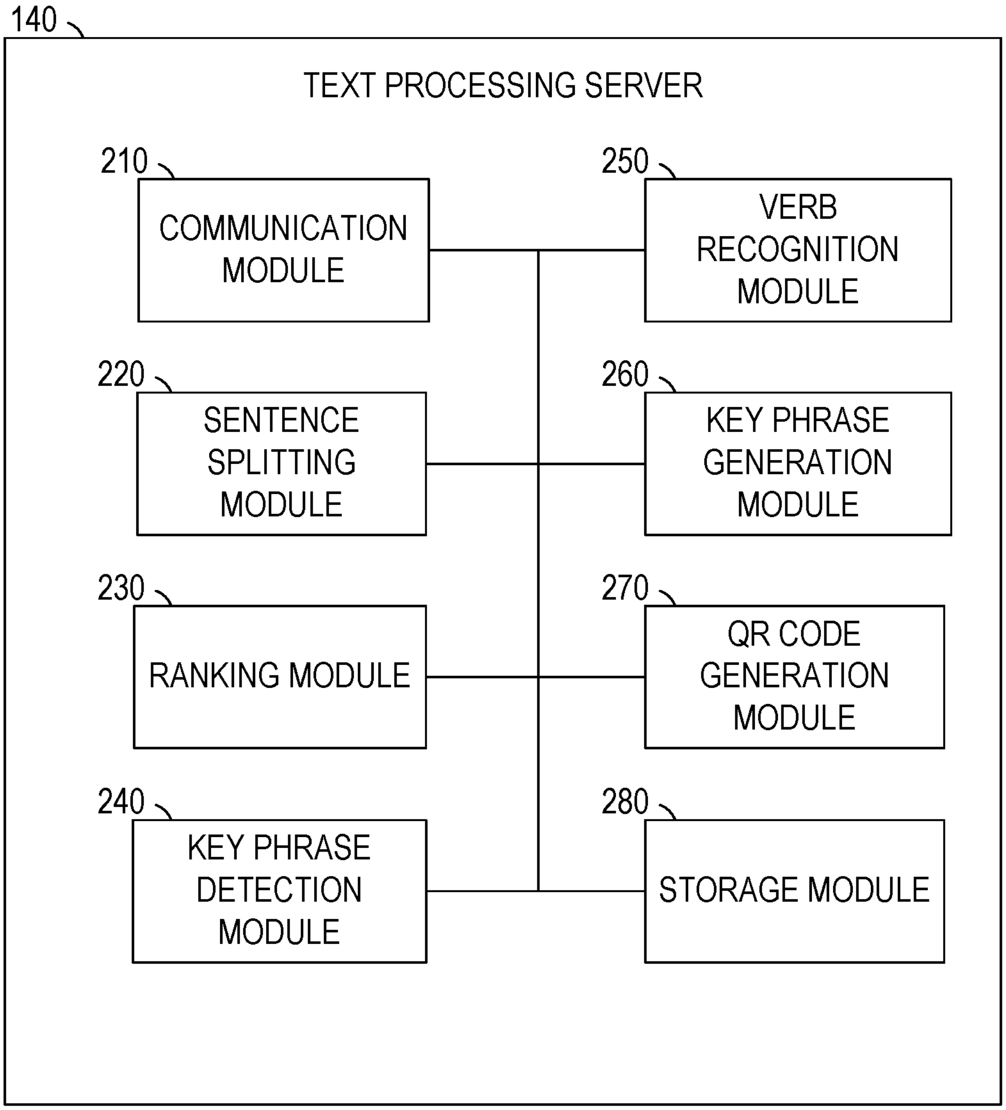
FIG. 2 is a block diagram of an example text processing server, suitable for determining meaning of text from a QR code and generating a compressed QR code based on the meaning.

FIG. 2 is a block diagram of an example text processing server 140, suitable for determining meaning of text from a QR code and generating a compressed QR code based on the meaning. The text processing server 140 is shown as including a communication module 210, a sentence splitting module 220, a ranking module 230, a key phrase detection module 240, a verb recognition module 250, a key phrase generation module 260, a QR code generation module 270, and a storage module 280, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the text processing server 140 and transmits data from the text processing server 140. For example, the communication module 210 may receive, from the QR code reader server 120, text represented by a QR code. The text may be stored on the text processing server 140 (e.g., on a hard drive) or in remote storage (e.g., a network storage device such as the database server 130). Communications sent and received by the communication module 210 may be intermediated by the network 160.

The sentence splitting module 220 divides the text represented by the QR code into sentences. For example, pySBD, a sentence boundary disambiguation Python package, may be used to perform the sentence splitting.

The sentences identified by the sentence splitting module 220 are ranked by the ranking module 230. For example, sentences may be ranked based on their position in the text (e.g., so that sentences that appear earlier in the text have higher ranking than sentences that appear later). As another example, sentences may be ranked based on length (e.g., so that sentences with fewer words have higher ranking than sentences that have more words). As still another example, sentences may be ranked by a trained machine learning model using reinforcement learning. Weighted combinations of these ranking methods may also be used.

The key phrase detection module 240 extracts key phrases (which may consist of individual or multiple words) from the text. For example, the KeyBERT tool may be used to perform the key phrase detection.

The verb recognition module 250 recognizes verbs and verb phrases in text. Words and phrases in the text may be compared to known verb words and phrases (e.g., from a list or database table) to determine which words and phrases in the text are verbs.

The key phrase generation module 260 selects text to be used for a compressed QR code, based on the identified sentences and their rankings, the extracted key phrases, and the recognized verbs. The selected text is used by the QR code generation module 270 to generate a compressed QR code. For example, the pyqrcode Python package may be used to generate the compressed QR code from the selected text.

Trained machine learning models, text, compressed text, QR codes, or any suitable combination thereof may be stored and accessed by the storage module 280. For example, local storage of the text processing server 140, such as a hard drive, may be used. As another example, network storage may be accessed by the storage module 280 via the network 160.

Figure 3:
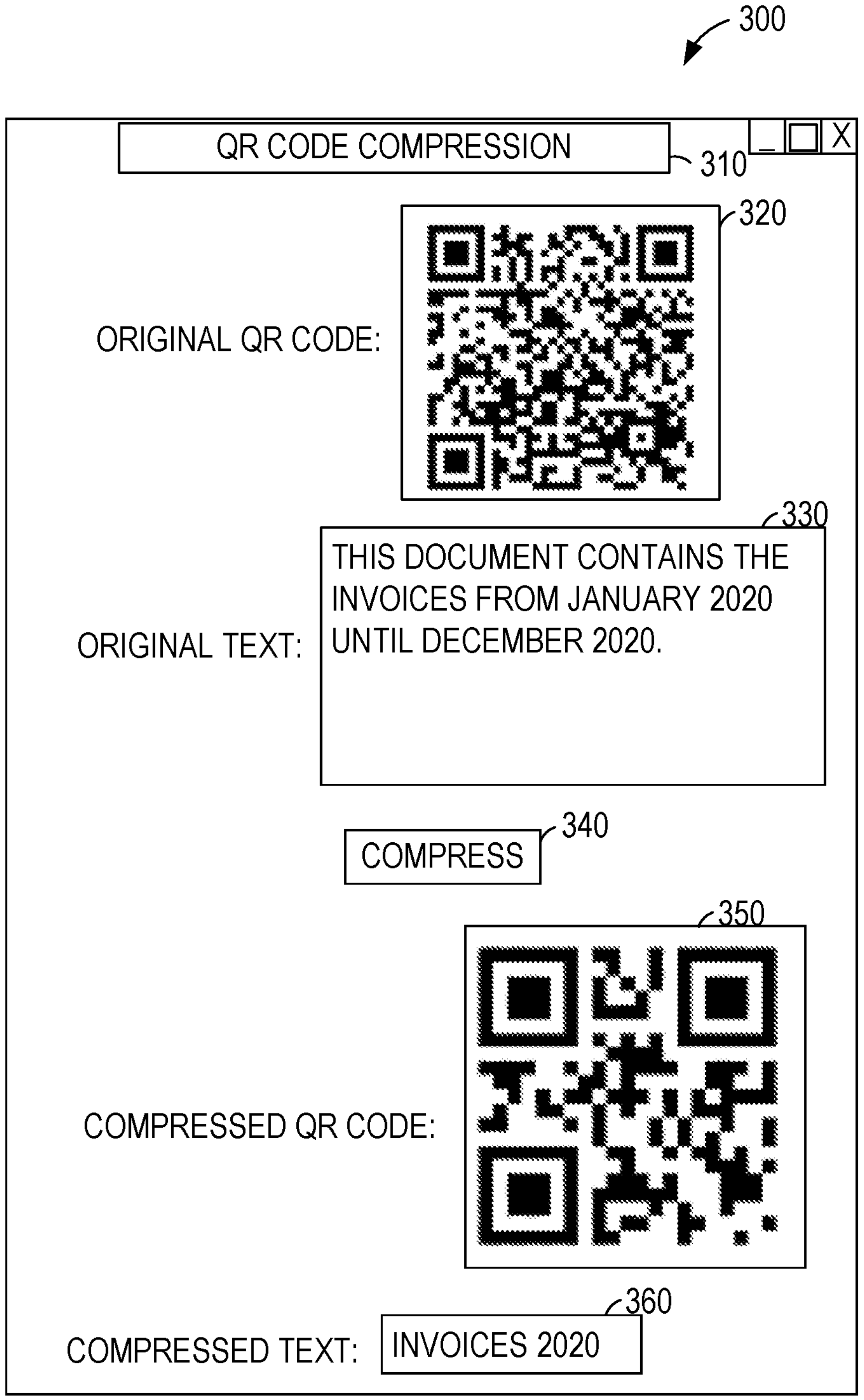
FIG. 3 is a block diagram of an example user interface suitable for intelligent QR code compression.

FIG. 3 is a block diagram of an example user interface 300 suitable for intelligent QR code compression. The user interface 300 includes a title 310, an original QR code 320, original text 330, a button 340, a compressed QR code 350, and compressed text 360. The title 310 indicates that the user interface 300 performs QR code compression. The user interface 300 may be presented on a client device 190 (e.g., by being transmitted as a web page from the QR code generation server 150).

The original QR code 320 shows a QR code that has been selected for compression. For example, a file picker may be used to select a QR code from a file system. Alternatively, the QR code may be captured using an image capture device such as a camera of a smart phone.

The original text 330 shows the text represented by the original QR code 320. For example, the original QR code 320 may be processed by the QR code reader server 120 to determine the represented text.

The user of the user interface 300 may press the button 340 to request compression of the original QR code 320. In response to detecting the press of the button 340, the text processing server 140 processes the original text 330 to generate the compressed text 360. The QR code generation server 150 generates the compressed QR code 350 that represents the compressed text 360, and the compressed QR code 350 and the compressed text 360 are displayed on the user interface 300.

Additional user interface elements may allow the user to save the compressed QR code 350, to print the compressed QR code 350, to select another QR code for compression, to select an amount of compression, or any suitable combination thereof. Thus, by use of the user interface 300, a user is enabled to reduce the size of the original QR code 320 while substantially maintaining the meaning of the original text 330.

For example, the user may select an amount of compression for the original QR code 320, such that a greater amount of compression results in a QR code that uses fewer modules than a QR code generated using a lesser amount of compression. However, the greater amount of compression also results in a QR code that represents fewer characters than a QR code generated using a lesser amount of compression. If the user selects an amount of compression, the text processing server 140 accesses the selection of an amount of compression for the first QR code, and the selection of the compressed text (e.g., one or more phrases from a set of key phrases) is based on the amount of compression.

Figure 4:
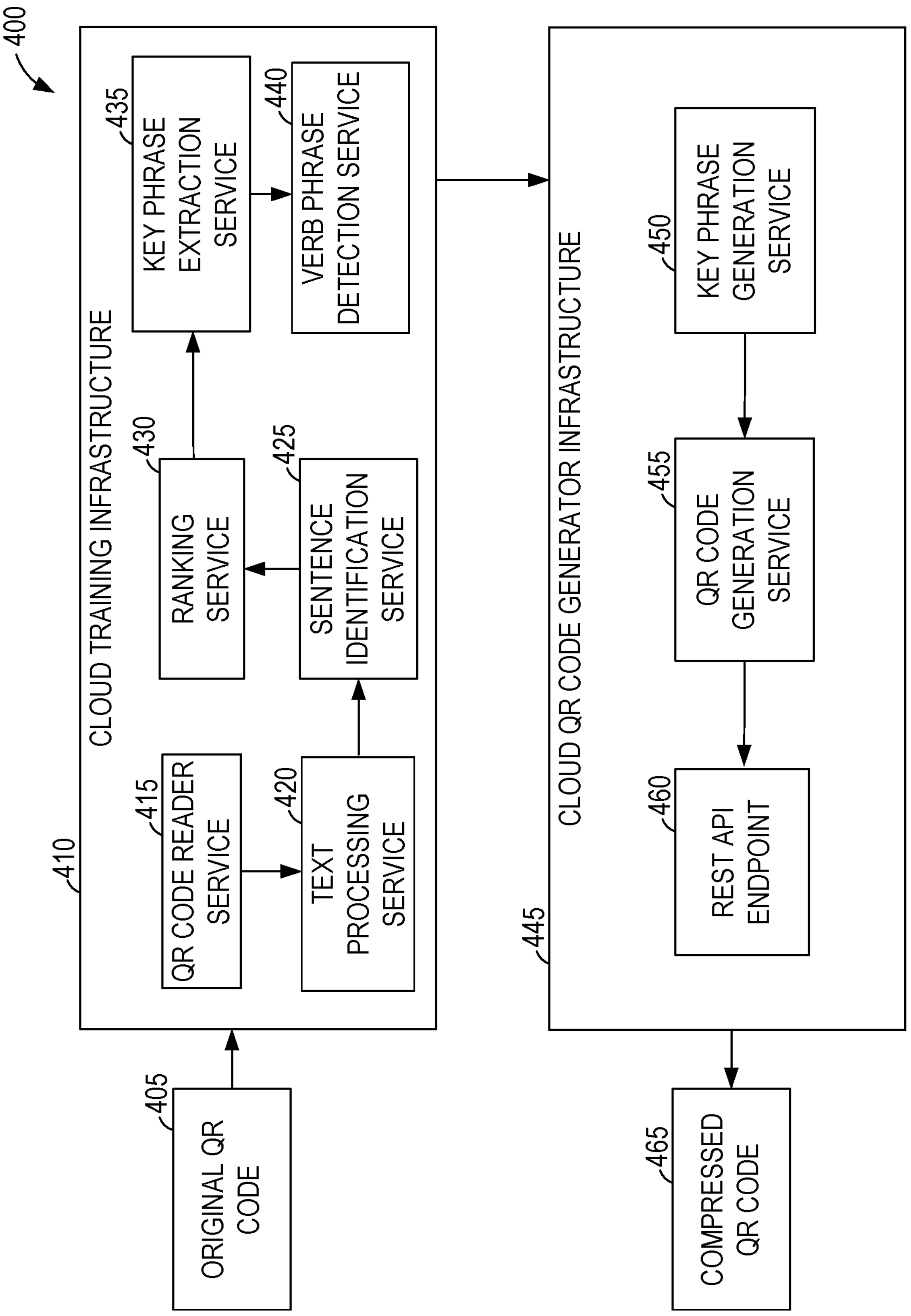
FIG. 4 is a block diagram illustrating a structure for intelligent QR code compression.

FIG. 4 is a block diagram illustrating a structure 400 for intelligent QR code compression. The structure 400 comprises an original QR code 405, a cloud training infrastructure 410, a cloud QR code generator infrastructure 445, and a compressed QR code 465. The cloud training infrastructure 410 includes a QR code reader service 415, a text processing service 420, a sentence identification service 425, a ranking service 430, a key phrase extraction service 435, and a verb phrase detection service 440. The cloud QR code generator infrastructure 445 includes a key phrase generation service 450, a QR code generation service 455, and a REST API endpoint 460.

The original QR code 405 (e.g., a version 40 QR code) is provided to the cloud training infrastructure 410 as input. The QR code reader service 415 determines the text represented by the original QR code 405. The text processing service 420 processes the text by providing the text to the sentence identification service 425. The sentence identification service 425 identifies sentences in the text. The sentences are ranked by the ranking service 430 and key phrases are extracted from the highest-ranking sentences by the key phrase extraction service 435. The verb phrase detection service 440 detects verb phrases in the sentences, the extracted key phrases, or both.

The ranking service 430 may rank the sentences identified by the sentence identification service 425 or the phrases extracted by the key phrase extraction service 435 by providing the phrases as inputs to a trained machine-learning model. For example, the machine-learning model may be trained using annotated phrases that indicate a degree of importance to a human reader of each phrase. After training, the machine-learning model generates an estimate of the degree of importance for input phrases.

The ranking of the sentences or phrases may further be based on the verbs detected by the verb phrase detection service 440. For example, phrases including verbs that indicate high importance or urgency may be ranked higher than phrases with less active verbs.

Alternatively, the cloud training infrastructure 410 may generate shortened text to use for a compressed QR code by providing the text of the original QR code to a machine-learning model that was trained using natural language text and shortened versions of the natural language text. For example, human readers may generate the training data and, after training, the machine-learning model can generate shortened text from natural language text. The shortened text may be provided to the QR code generation service 455.

Based on the extracted key phrases and the detected verbs, the key phrase generation service 450 of the cloud QR code generator infrastructure 445 generates one or more key phrases to use for a compressed QR code. The QR code generation service 455 generates the compressed QR code 465 (e.g., a QR code with a lower version than the original QR code 405) that represents the generated one or more key phrases. The REST API endpoint 460 provides the compressed QR code 465 to a remote device. For example, the client device 190 may provide the original QR code 405 and receive the compressed QR code 465 via communication with the REST API endpoint 460.

As a first example, the original QR code may represent the text:

The Ethnobotanical Research and Language Documentation of Nahuatl corpus consists of approximately 190 hours of field recordings collected in the Sierra Nororiental and Sierra Norte regions of Puebla, Mexico. The corpus contains audio and video recordings of native Nahuatl speakers during the collection of particular plants; partial transcripts (Nahuatl and Spanish); a Highland Puebla Nahuat dictionary; botanical and ethnobotanical data; and speaker metadata.

The reduced text for the compressed QR code for the first example may be:

The Ethnobotanical Research and Language Documentation of Nahuatl corpus consists of approximately 190 hours of field recordings collected in the Sierra Nororiental and Sierra Norte regions of Puebla, Mexico. audio and video plants; Nahuatl and Spanish.

As a second example, the original QR code may represent the text:

On Apr. 5, 2018, following satisfaction of applicable regulatory and other approvals, we acquired 100% of the shares of Callidus Software Inc. (Callidus) (NDSQ: CALD), a leading provider of customer relationship management (CRM) solutions. SAP paid US$36 per share, representing consideration transferred in cash of approximately US$2.4 billion. The acquisition aimed to accelerate and strengthen SAP's position and solution offerings in the sales performance management (SPM) and configure-price-quote (CPQ) spaces.

The reduce text for the compressed QR code for the second example may be:

On Apr. 5, 2018, SAP acquired 100% of the shares of Callidus Software Inc.(Callidus) (NDSQ: CALD), a leading provider of customer relationship management (CRM) solutions. US$36 per share, US$2.4 billion.

Figure 5:
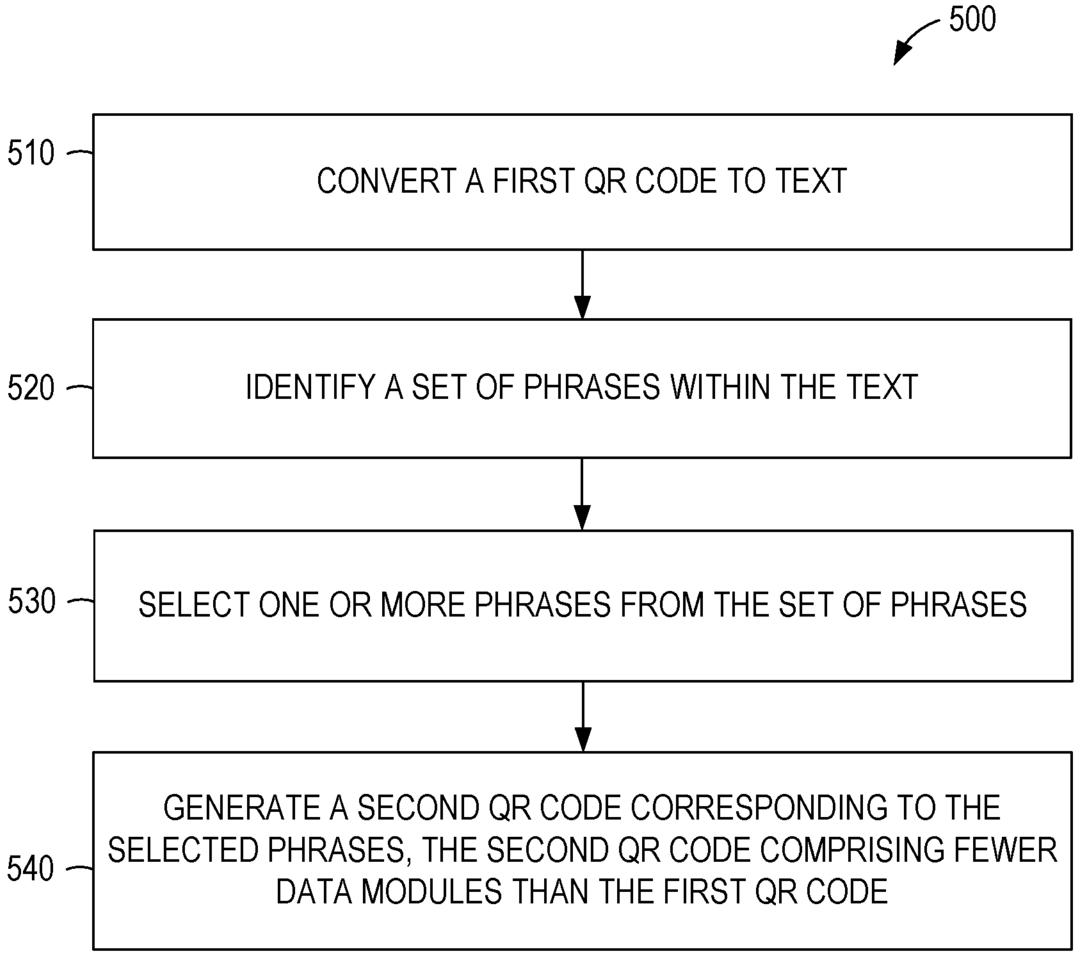
FIG. 5 is a flowchart illustrating operations of an example method suitable for intelligent QR code compression.

FIG. 5 is a flowchart illustrating operations of an example method 500 suitable for intelligent QR code compression. The method 500 includes operations 510, 520, 530, and 540. By way of example and not limitation, the method 500 is described as being performed by the QR code reader server 120 and the text processing server 140 of FIG. 1, using the modules of FIG. 2 and the user interface 300 of FIG. 3.

In operation 510, the QR code reader server 120 converts a first QR code to text. For example, the original QR code 320 of FIG. 3 may be converted to the original text 330.

The key phrase detection module 240, in operation 520, identifies a set of phrases within the text. The text may also undergo additional processing, such as sentence identification and ranking.

In operation 530, the key phrase generation module 260 selects one or more phrases from the set of phrases. Alternatively, the key phrase generation module 260 may generate one or more phrases based on the text, such that the generated phrase does not appear in the original text. For example, the compressed text 360 may be selected or generated.

The QR code generation module 270, in operation 540, generates a second QR code corresponding to the selected or generated phrases. The second QR code comprises fewer data modules than the first QR code. For example, the compressed QR code 350 may be generated. The version of the generated QR code is selected as the lowest version that stores sufficient data to store the compressed text, using the same error correction as the original QR code. Alternatively, different error correction may be used.

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: converting, by one or more processors, a first quick response (QR) code to text; identifying, by the one or more processors, a set of phrases within the text; selecting, by the one or more processors, one or more phrases from the set of phrases; and generating, by the one or more processors, a second QR code corresponding to the selected phrases, the second QR code comprising fewer data modules than the first QR code.

In Example 2, the subject matter of Example 1 includes ranking the phrases in the set of phrases.

In Example 3, the subject matter of Example 2, wherein the ranking of the phrases comprises providing the phrases as inputs to a trained machine-learning model.

In Example 4, the subject matter of Examples 2-3 includes identifying verbs in the phrases in the set of phrases; wherein the ranking of the phrases is based on the identified verbs.

In Example 5, the subject matter of Examples 1~4 includes identifying sentences in the set of phrases.

In Example 6, the subject matter of Examples 1-5 includes training a machine-learning model using natural language text and shortened versions of the natural language text.

In Example 7, the subject matter of Examples 1-6 wherein the first QR code is a version 40 QR code.

In Example 8, the subject matter of Examples 1-7 includes accessing a selection of an amount of compression for the first QR code; wherein the selecting of the one or more phrases from the set of phrases is based on the amount of compression.

Example 9 is a system comprising: a memory that stores instructions; and one or more processors configured by the instructions to perform operations comprising: converting a first quick response (QR) code to text; identifying a set of phrases within the text; selecting one or more phrases from the set of phrases; and generating a second QR code corresponding to the selected phrases, the second QR code comprising fewer data modules than the first QR code.

In Example 10, the subject matter of Example 9, wherein the operations further comprise: ranking the phrases in the set of phrases.

In Example 11, the subject matter of Example 10, wherein the ranking of the phrases comprises providing the phrases as inputs to a trained machine-learning model.

In Example 12, the subject matter of Examples 10-11, wherein the operations further comprise: identifying verbs in the phrases in the set of phrases; wherein the ranking of the phrases is based on the identified verbs.

In Example 13, the subject matter of Example 9 includes, wherein the operations further comprise: identifying sentences in the set of phrases.

In Example 14, the subject matter of Examples 9-13 includes, wherein the operations further comprise: training a machine-learning model using natural language text and shortened versions of the natural language text.

Example 15 is a non-transitory computer-readable medium that stores instructions that, when executed by one or more processors, cause the one or more processors to perform operations comprising: converting a first quick response (QR) code to text; identifying a set of phrases within the text; selecting one or more phrases from the set of phrases; and generating a second QR code corresponding to the selected phrases, the second QR code comprising fewer data modules than the first QR code.

In Example 16, the subject matter of Example 15, wherein the operations further comprise: ranking the phrases in the set of phrases.

In Example 17, the subject matter of Example 16, wherein the ranking of the phrases comprises providing the phrases as inputs to a trained machine-learning model.

In Example 18, the subject matter of Examples 16-17, wherein the operations further comprise: identifying verbs in the phrases in the set of phrases; wherein the ranking of the phrases is based on the identified verbs.

In Example 19, the subject matter of Examples 15-18, wherein the operations further comprise: identifying sentences in the set of phrases.

In Example 20, the subject matter of Examples 15-19, wherein the operations further comprise: training a machine-learning model using natural language text and shortened versions of the natural language text.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 6:
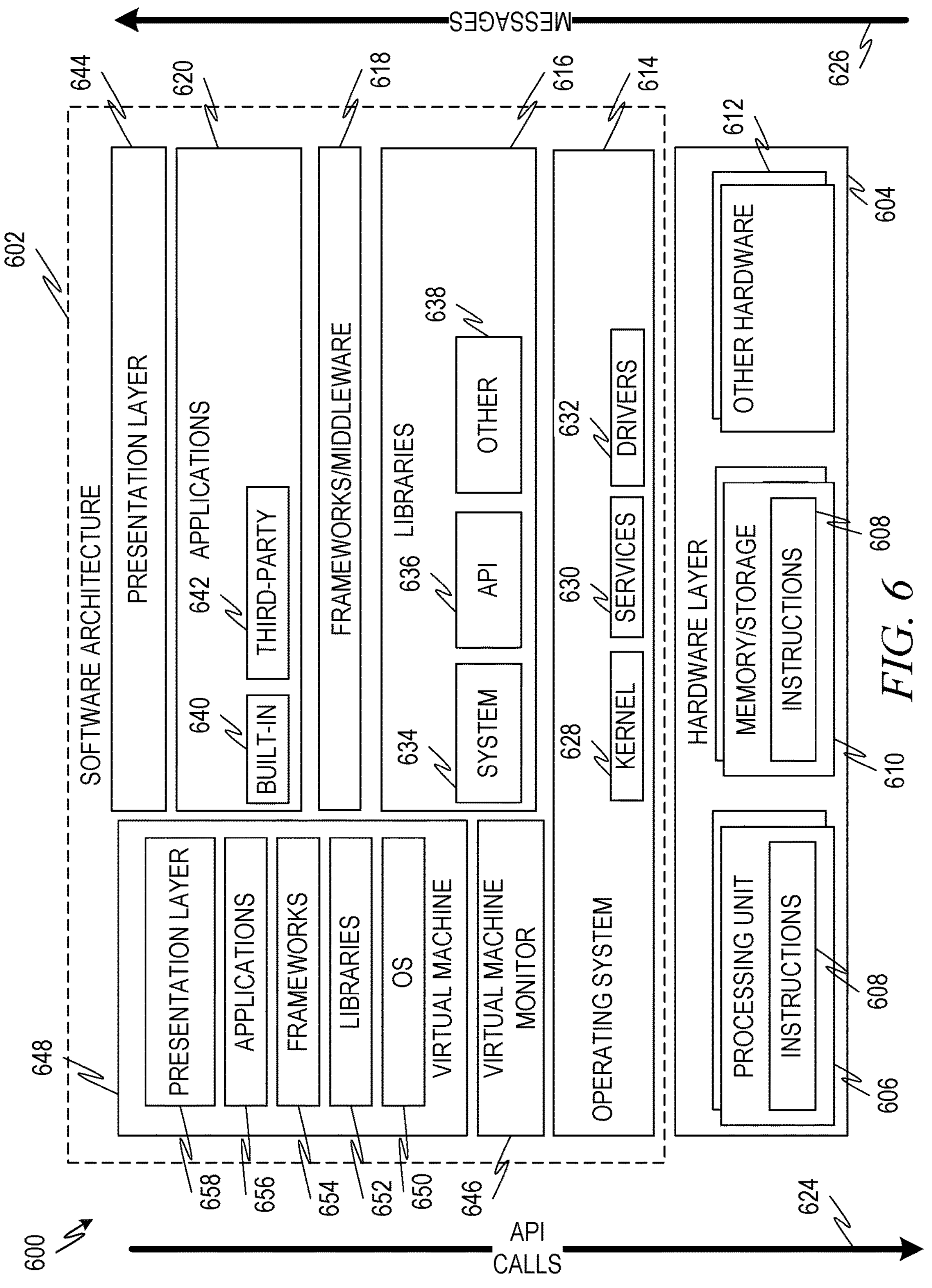
FIG. 6 is a block diagram showing one example of a software architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 6.

The representative hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612, which represents any other hardware of the hardware layer 604, such as the other hardware illustrated as part of the software architecture 602.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and presentation layer 644. Operationally, the applications 620 and/or other components within the layers may invoke application programming interface (API) calls 624 through the software stack and access a response, returned values, and so forth illustrated as messages 626 in response to the API calls 624. The layers illustrated are representative in nature and not all software architectures have all layers. For example, some mobile or special purpose operating systems may not provide a frameworks/middleware 618 layer, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks/middleware 618 may provide a higher-level common infrastructure that may be utilized by the applications 620 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any of the built-in applications as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built in operating system functions (e.g., kernel 628, services 630 and/or drivers 632), libraries (e.g., system libraries 634, API libraries 636, and other libraries 638), frameworks/middleware 618 to create user interfaces to interact with users of the system. Alternatively, or additionally, in some systems, interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656, and/or presentation layer 658. These layers of software architecture executing within the virtual machine 648 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 7:
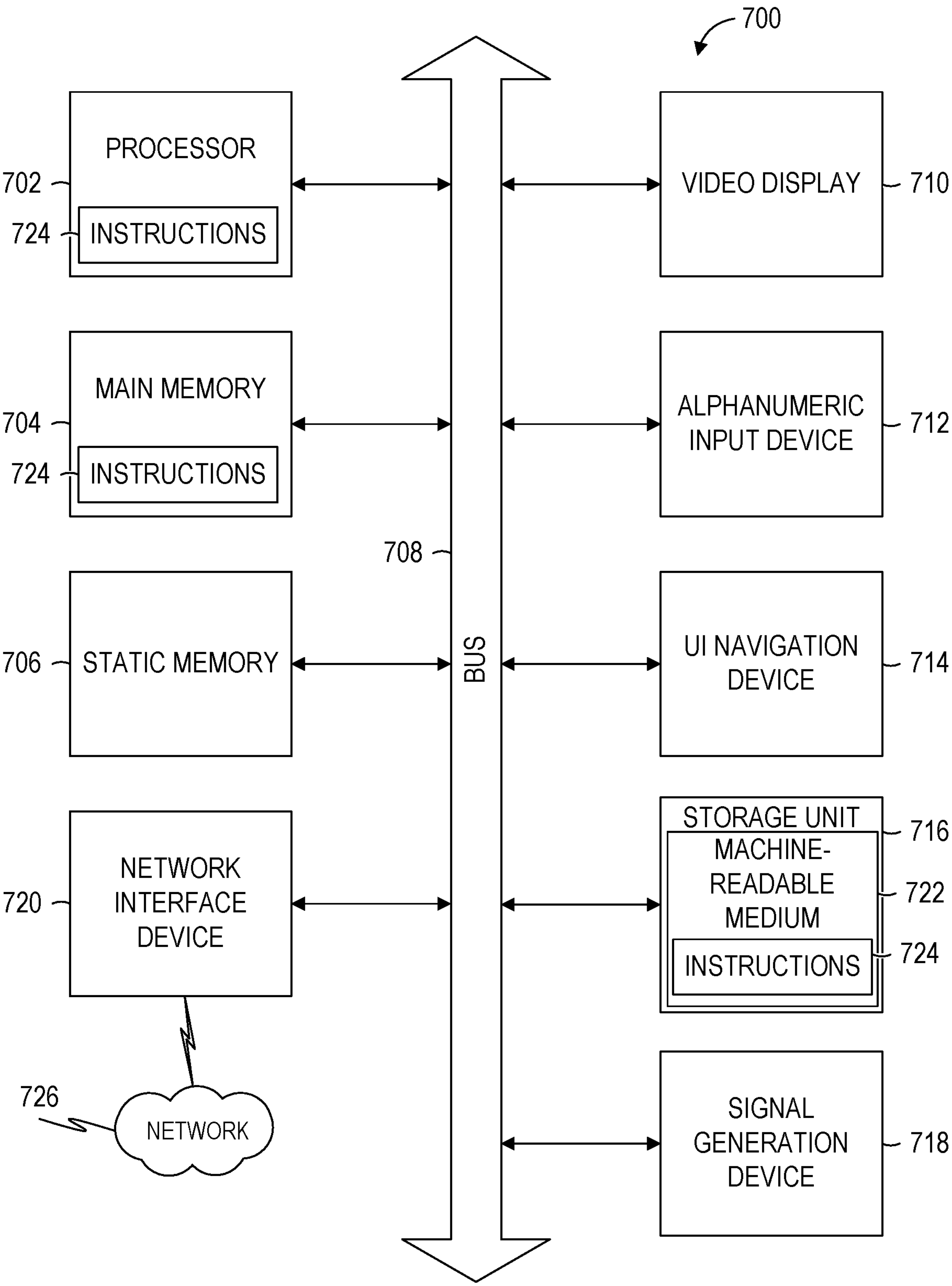
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a storage unit 716, a signal generation device 718 (e.g., a speaker), and a network interface device 720.

Machine-Readable Medium

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in FIG. 7 to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 724 may further be transmitted or received over a communications network 726 using a transmission medium. The instructions 724 may be transmitted using the network interface device 720 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
converting, by one or more processors, a first quick response (QR) code to text;
accessing a selection of an amount of compression for the first QR code;
identifying, by the one or more processors, a set of phrases within the text;
ranking the phrases in the set of phrases;
selecting, by the one or more processors, one or more phrases from the set of phrases based on the amount of compression and the ranking; and
generating, by the one or more processors, a second QR code corresponding to the selected phrases, the second QR code comprising fewer data modules than the first QR code.

2. The method of claim 1, wherein the ranking of the phrases comprises providing the phrases as inputs to a trained machine-learning model.

3. The method of claim 1, further comprising:
identifying verbs in the phrases in the set of phrases;
wherein the ranking of the phrases is based on the identified verbs.

4. The method of claim 1, further comprising:
identifying sentences in the set of phrases.

5. The method of claim 1, further comprising:
training a machine-learning model using natural language text and shortened versions of the natural language text, wherein the ranking of the phrases in the set of phrases is performed by the trained machine-learning model.

6. The method of claim 1, wherein the first QR code is a version 40 QR code.

7. A system comprising:
a memory that stores instructions; and
one or more processors configured by the instructions to perform operations comprising:
converting a first quick response (QR) code to text;
accessing a selection of an amount of compression for the first QR code;
identifying, by the one or more processors, a set of phrases within the text;
ranking the phrases in the set of phrases;
selecting one or more phrases from the set of phrases based on the amount of compression and the ranking; and
generating a second QR code corresponding to the selected phrases, the second QR code comprising fewer data modules than the first QR code.

8. The system of claim 7, wherein the ranking of the phrases comprises providing the phrases as inputs to a trained machine-learning model.

9. The system of claim 7, wherein the operations further comprise:
identifying verbs in the phrases in the set of phrases;
wherein the ranking of the phrases is based on the identified verbs.

10. The system of claim 7, wherein the operations further comprise:
identifying sentences in the set of phrases.

11. The system of claim 7, wherein the operations further comprise:
training a machine-learning model using natural language text and shortened versions of the natural language text, wherein the ranking of the phrases in the set of phrases is performed by the trained machine-learning model.

12. The system of claim 7, wherein the first QR code is a version 40 QR code.

13. The system of claim 7, wherein the operations further comprise:
accessing a selection of an amount of compression for the first QR code, wherein the selecting of the one or more phrases from the set of phrases is based on the amount of compression.

14. A non-transitory computer-readable medium that stores instructions that, when executed by one or more processors, cause the one or more processors to perform operations comprising:
converting a first quick response (QR) code to text;
accessing a selection of an amount of compression for the first QR code;
identifying, by the one or more processors, a set of phrases within the text;
ranking the phrases in the set of phrases;
selecting one or more phrases from the set of phrases based on the amount of compression and the ranking; and
generating a second QR code corresponding to the selected phrases, the second QR code comprising fewer data modules than the first QR code.

15. The non-transitory computer-readable medium of claim 14, wherein the ranking of the phrases comprises providing the phrases as inputs to a trained machine-learning model.

16. The non-transitory computer-readable medium of claim 14, wherein the operations further comprise:
identifying verbs in the phrases in the set of phrases;
wherein the ranking of the phrases is based on the identified verbs.

17. The non-transitory computer-readable medium of claim 14, wherein the operations further comprise:
identifying sentences in the set of phrases.

18. The non-transitory computer-readable medium of claim 14, wherein the operations further comprise:
training a machine-learning model using natural language text and shortened versions of the natural language text, wherein the ranking of the phrases in the set of phrases is performed by the trained machine-learning model.

19. The non-transitory computer-readable medium of claim 14, wherein the first QR code is a version 40 QR code.

* * * * *